(12) United States Patent
Wan (10) Patent No.: US 12,354,248 B2
(45) Date of Patent: Jul. 8, 2025

(54) IMAGE PROCESSING METHOD AND APPARATUS, MODEL TRAINING METHOD AND APPARATUS, AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventor: Shaohua Wan, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 820 days.

(21) Appl. No.: 17/646,221

(22) Filed: Dec. 28, 2021

(65) Prior Publication Data

US 2022/0405896 A1 Dec. 22, 2022

(30) Foreign Application Priority Data

Jun. 18, 2021 (CN) .......................... 202110679122.8

(51) Int. Cl.
*G06T 5/80* (2024.01)
*G06T 5/20* (2006.01)
(52) U.S. Cl.
CPC . *G06T 5/80* (2024.01); *G06T 5/20* (2013.01)
(58) Field of Classification Search
CPC .................................... G06T 5/80; G06T 5/20
See application file for complete search history.

(56) References Cited

U.S. PATENT DOCUMENTS

2010/0110238 A1* 5/2010 Kang ..................... H04N 25/61
348/E9.037
2019/0220746 A1 7/2019 Liu et al.
(Continued)

FOREIGN PATENT DOCUMENTS

CN 1874528 A 12/2006
CN 105844640 A 8/2016
(Continued)

OTHER PUBLICATIONS

Nikonorov, A. et al., "Toward Ultralightweight Remote Sensing With Harmonic Lenses and Convolutional Neural Networks," IEEE Journal of Selected Topics in Applied Earth Observations and Remote Sensing, vol. 11, No. 9, Sep. 2018, 11 pages.
(Continued)

*Primary Examiner* — David Perlman
(74) *Attorney, Agent, or Firm* — McCoy Russell LLP (57) ABSTRACT

An image processing method and apparatus, a model training method and apparatus, and a storage medium. The image processing method includes: acquiring a to-be-processed image; and inputting the to-be-processed image into a chromatic aberration-removing model to obtain a target image output by the chromatic aberration-removing model, where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

18 Claims, 6 Drawing Sheets

(56) References Cited

U.S. PATENT DOCUMENTS

| | | | |
|---|---|---|---|
| 2020/0134797 A1 | 4/2020 | Zhang et al. | |
| 2021/0279851 A1* | 9/2021 | Oniki | G06N 3/045 |
| 2022/0051373 A1* | 2/2022 | Kappel | G06T 5/60 |

FOREIGN PATENT DOCUMENTS

| | | | |
|---|---|---|---|
| CN | 107038446 A | 8/2017 | |
| CN | 109903256 A | 6/2019 | |
| CN | 111275128 A | 6/2020 | |
| CN | 112330709 A | 2/2021 | |
| CN | 112634169 A | 4/2021 | |
| DE | 102018222147 A1 | 6/2020 | |
| JP | 2011182001 A | 9/2011 | |

OTHER PUBLICATIONS

Malleson, C. et al., "Joint Demosaicing and Chromatic Aberration Correction of Images Using Neural Networks," Proceedings of CVMP '19: European Conference on Visual Media Production, Dec. 17, 2019, London, UK, 1 page.

Chen, H. et al., "Attention in Attention Network for Image Super-Resolution," arXiv Cornell University Website, Available Online at https://arxiv.org/abs/2104.09497, Available as Early as Apr. 19, 2021, 10 pages.

* cited by examiner

IMAGE PROCESSING METHOD AND APPARATUS, MODEL TRAINING METHOD AND APPARATUS, AND STORAGE MEDIUM

CROSS-REFERENCE TO RELATED APPLICATION

The present application claims priority to Chinese Patent Application No. 202110679122.8, filed on Jun. 18, 2021. The entire contents of the above-listed application are hereby incorporated by reference for all purposes.

BACKGROUND

As we all know, the chromatic aberration of the camera lens will cause the edge of the object in the captured image to appear a color that does not belong to the object. We call the color that appears at the edge of the object chromatic fringing (an optical chromatic aberration phenomenon). For example, when digital imaging devices such as digital cameras and surveillance cameras are used to shoot high-dynamic (HDR) scene images under backlight and large aperture conditions, the edges of the high-contrast areas in the obtained images are prone to purple, blue, red, and green edges. The reason for the formation of chromatic fringing can be considered that the camera lens can only accurately focus light of one wavelength, but cannot accurately focus light of other wavelengths.

SUMMARY

The present disclosure relates to the technical field of image processing, and in particular, to an image processing method and apparatus, a model training method and apparatus, and a storage medium.

In order to solve the problems in related arts, the disclosure provides an image processing method and apparatus, a model training method and device, and a storage medium, so as to provide a method different from the related arts to remove chromatic fringing in an image and improve the effect of removing the chromatic fringing in the image.

According to a first aspect of examples of the disclosure, an image processing method is provided. The method includes:
  acquiring, a to-be-processed image;
  inputting, the to-be-processed image into a chromatic aberration-removing model to obtain a target image output by the chromatic aberration-removing model,
  where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

According to a second aspect of examples of the disclosure, a method for training a chromatic aberration-removing model is provided. The method includes:
  acquiring, one or a plurality of chromatic-aberration-free images, and constructing a chromatic-aberration image corresponding to the chromatic-aberration-free image;
  generating, a training data set according to one or a plurality of chromatic-aberration-free images and the corresponding chromatic-aberration image;
  training, a deep convolutional neural network model according to the training data set to obtain the chromatic aberration-removing model.

According to a third aspect of examples of the disclosure, an image processing apparatus is provided. The apparatus includes:
  an acquisition module, configured to acquire a to-be-processed image;
  an input module, configured to input the to-be-processed image into a chromatic aberration-removing model to obtain a target image output by the chromatic aberration-removing model,
  where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

According to a fourth aspect of examples of the disclosure, an image processing apparatus is provided. The apparatus includes:
  a processor;
  a memory for storing processor executable instructions.
  The processor is configured to:
  acquire a to-be-processed image;
  input the to-be-processed image into a chromatic aberration-removing model to obtain a target image output by the chromatic aberration-removing model,
  where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

According to a fifth aspect of examples of the disclosure, an apparatus for training a chromatic aberration-removing model is provided. The apparatus includes:
  a processor;
  a memory for storing processor executable instructions;
  where the processor is configured to:
  acquire one or a plurality of chromatic-aberration-free images, and construct a chromatic-aberration image corresponding to the chromatic-aberration-free image;
  generate a training data set according to one or a plurality of chromatic-aberration-free images and the corresponding chromatic-aberration image;
  train a deep convolutional neural network model according to the training data set to obtain the chromatic aberration-removing model.

According to a sixth aspect of examples of the disclosure, a computer-readable storage medium is provided. The computer-readable storage medium stores a computer program instruction. When the program instruction is executed by a processor, the steps of any method provided by the first aspect and the second aspect of the disclosure are implemented.

It should be understood that the above general description and the following detailed description are only exemplary and explanatory, and cannot limit the disclosure.

BRIEF DESCRIPTION OF THE FIGURES

The accompanying drawings herein are incorporated into the specification and constitute a part of the specification, show examples consistent with the disclosure, and are used to explain the principle of the disclosure together with the specification.

DETAILED DESCRIPTION

Exemplary examples will be described in detail here, and examples thereof are shown in the accompanying drawings. When the following descriptions refer to the drawings, the same numbers in different drawings indicate the same or similar elements, unless otherwise indicated. The implementation manners described in the following exemplary examples do not represent all implementation manners consistent with the disclosure. Instead, they are merely examples of apparatuses and methods consistent with some aspects of the disclosure.

As we all know, the chromatic aberration of the camera lens will cause the edge of the object in the captured image to appear a color that does not belong to the object. We call the color that appears at the edge of the object chromatic fringing (an optical chromatic aberration phenomenon). For example, when digital imaging devices such as digital cameras and surveillance cameras are used to shoot high-dynamic (HDR) scene images under backlight and large aperture conditions, the edges of the high-contrast areas in the obtained images are prone to purple, blue, red, and green edges. The reason for the formation of chromatic fringing can be considered that the camera lens can only accurately focus light of one wavelength, but cannot accurately focus light of other wavelengths.

In the related art, the chromatic fringing phenomenon can be reduced by improving the material of the optical lens or laminating the optical lens, but this will greatly increase the hardware cost of the camera, and the effect of suppressing the chromatic fringing is poor. In recent years, the method of removing chromatic fringing in an image through an image processing algorithm has received more and more attention due to its low cost and good effect. Specifically, the method of using an image processing algorithm to remove chromatic fringing in an image can be divided into three steps: the first step is to perform edge detection of high-contrast areas (object edge detection) on the image. Since chromatic fringing usually appears on the edge of high-contrast areas, so the position where chromatic fringing may appear can be determined by detecting the edge of the high-contrast area. The second step is to judge the chromatic aberration of the pixels at the edge of the object, that is, after the edge of the high-contrast area is found, it is necessary to judge the chromatic aberration of the edge so as to exclude the non-chromatic aberration edge. The third step is to perform chromatic aberration suppression or color restoration on the pixel points with chromatic aberration at the edge of the object to restore the original color of the edge.

However, in each step of the above method of using an image processing algorithm to remove chromatic fringing in an image, misjudgment may occur, thereby affecting the final effect of removing chromatic fringing. For example, when the edge of the object is detected incorrectly, it may result in that the chromatic fringing will not be subjected to chromatic aberration suppression or color restoration due to that the edge of the object with chromatic fringing originally is not determined as the edge of the object, so that the effect of removing chromatic fringing is poor. For another example, the chromatic aberration suppression of the chromatic fringing may cause color loss, and the color restoration of the chromatic fringing may introduce new wrong colors to form a new chromatic fringing, which will also lead to a poor effect of removing the chromatic fringing.

In order to make those of ordinary skill in the art understand the technical solutions of the disclosure more easily, related professional terms which the disclosure relates to are explained simply below.

YUV is an image format used in videos, pictures, cameras and other applications. Actually, YUV is the name of a common color space of all "YUV" pixel formats. The YUV format is different from the RGB format (red, green and blue). YUV is represented by a "brightness" component called Y (equivalent to grayscale) and two "chromaticity" components which are respectively called U, namely, R-Y (blue projection) and V, namely B-Y (red projection). This color representation method is the so-called YUV color space representation. The importance of the YUV color space is that its brightness signal Y and chromaticity signals U and V are separated. If there is only Y signal component but no U and V signal components, the image represented in this way is a black and white grayscale image.

The principle that chromatic fringing appears in the image is that light with different wavelengths is mixed to form most light sources in nature and the optical lens of the camera has different refractive indexes on the light with different wavelengths, so when the optical lens is designed, green light is usually selected to be focused correctly, resulting in the problem of inaccurate focusing of light with other colors. Since light with many colors cannot be focused correctly, the phenomenon of chromatic fringing will occur when the optical lens is used for imaging. The chromatic purple edge in the chromatic fringing is the most common color fringing. In a possible situation, in the process of taking photos with a digital camera, the edge of the photographed object has a large contrast between light and shade, so at the junction of high-light and low-light edges, there may be a purple-red edge that does not exist due to that the blue and red channels cannot be focused completely accurately.

Before the detailed description of the examples for the technical solution of the disclosure, it should be stated that information associated with users and used in the examples of the disclosure, such as to-be-processed image acquired from a user side and training data acquired from the user side for training the chromatic aberration-removing model, is all acquired/used with the authorization or consent of the users.

Detailed example description is performed below for the technical solution of the disclosure.

Figure 1:
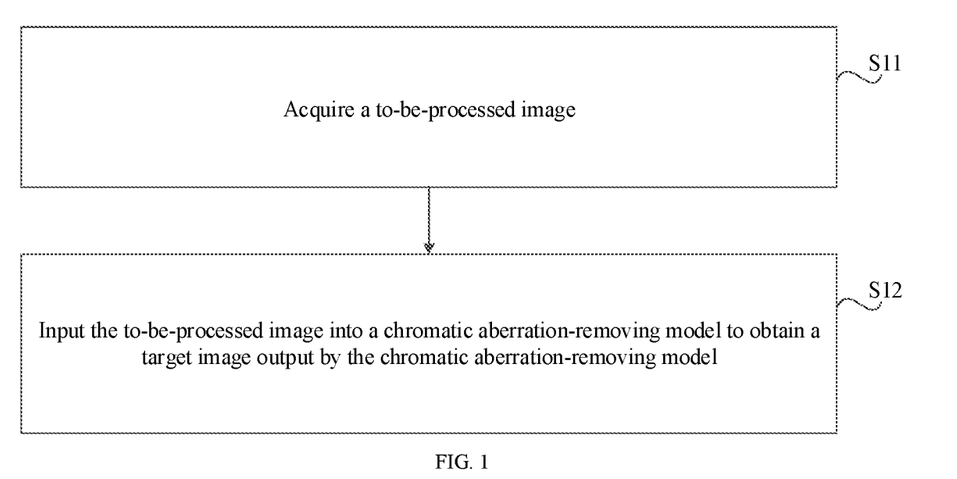
FIG. 1 is a flowchart of an image processing method according to an example.

FIG. 1 is a flowchart of an image processing method according to an example. As shown in FIG. 1, the image processing method may be applied to a terminal, and may also be applied to a video camera, for example, it may be applied to an algorithm for post-processing the image obtained after camera imaging, and may also be applied to a server. The image processing method may include the following steps.

In step S11, a to-be-processed image is acquired.

Chromatic fringing is present at the object edge in the to-be-processing image.

It should be noted that in the disclosure, other terms of the object edge are object contour and high-contrast area edge.

High contrast refers to the contrast range of black-white images, which is described by a technology (tonal range) on a gray scale (scale) with equal intervals from black to white. The object edge may be understood as the junction of high-light and low-light edges.

Under the scenario that the image processing method provided by the disclosure is applied to a user terminal or a server, in an implementable manner, before the to-be-processed image is acquired, the image processing method further may include the following steps:

an image input by a user is acquired in response to an input operation performed by the user; in a case that the image format of the image input by the user is an RGB format, format conversion is performed on the image input by the user to obtain the to-be-processed image with a YUV format; and in a case that the image format of the image input by the user is the YUV format, the image input by the user directly serves as the to-be-processed image.

Those of ordinary skill in the art should understand that the image formats RGB and YUV may be mutually converted.

In this way, it may adapt to the requirements of users to perform chromatic fringing removal on an image (the image may be acquired by the user from any channel) uploaded or selected by a user.

In step S12, the to-be-processed image is input into a chromatic aberration-removing model to obtain a target image output by the chromatic aberration-removing model.

The image formats of the to-be-processed image and the target image are YUV formats.

where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

The chromatic-aberration-free image may be a clean image without chromatic fringing photographed by a high-quality optical lens. Or the chromatic-aberration-free image may be a clean image without chromatic fringing collected from a network. The disclosure does not specifically limit the acquisition mode of the chromatic-aberration-free image.

Optionally, the training data set includes a chromatic-aberration image and a chromatic-aberration-free image corresponding to the chromatic-aberration image. The chromatic-aberration image corresponding to the chromatic-aberration-free image is obtained by the following modes:

a brightness signal and a chromaticity signal of the chromatic-aberration-free image are separated to obtain a brightness image corresponding to the brightness signal of the chromatic-aberration-free image and obtain a chromaticity image corresponding to the chromaticity signal of the chromatic-aberration-free image; an object edge image is determined according to the brightness image, and a chromatic fringing with a preset width is added at the object edge in the chromaticity image based on object edge position information represented by the object edge image to obtain a new chromaticity image; and the brightness image and the new chromaticity image are synthesized to obtain the chromatic-aberration image corresponding to the chromatic-aberration-free image.

Figure 2:
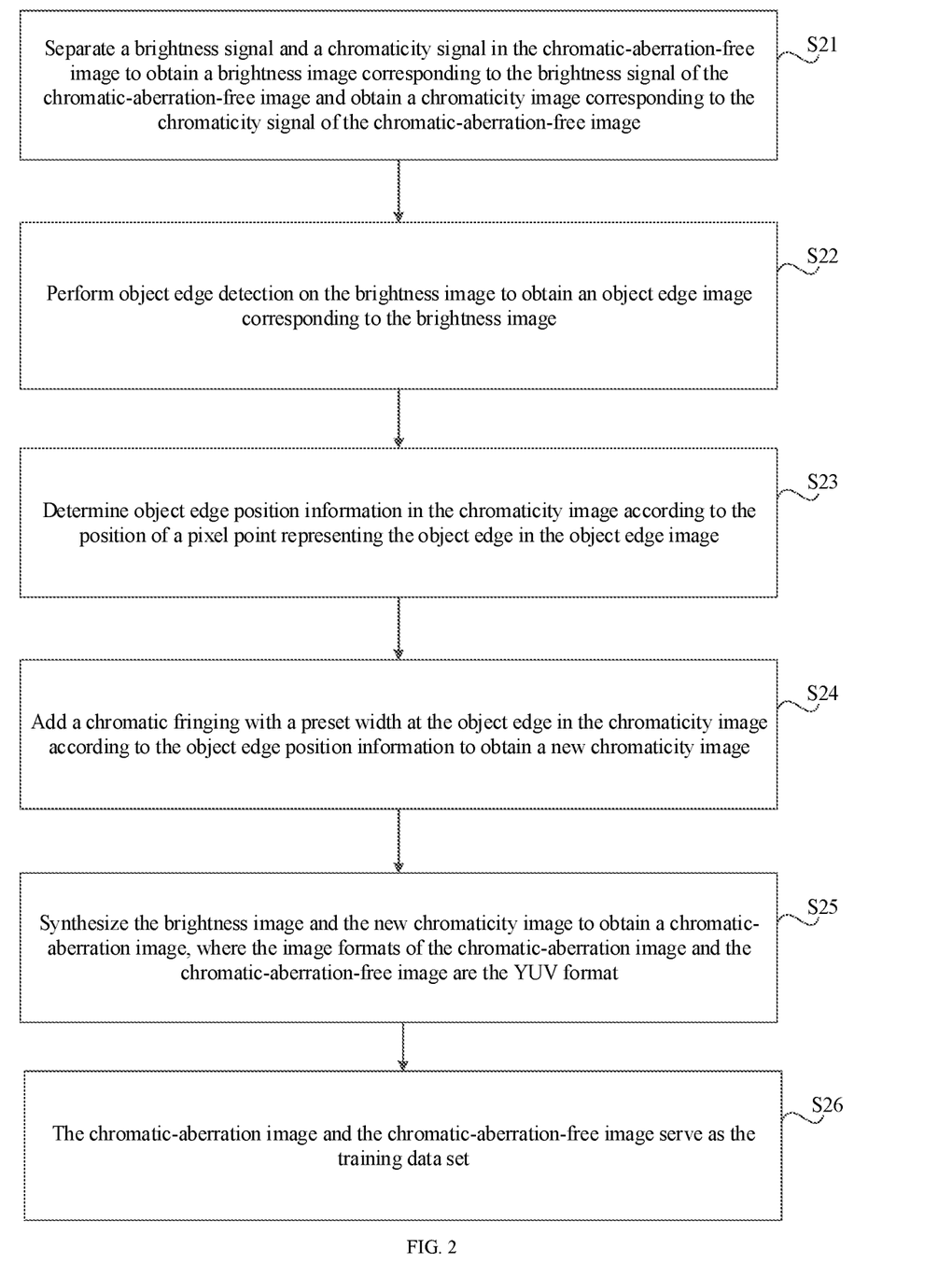
FIG. 2 is a flowchart of a method for constructing a training data set according to an example.

Exemplarily, the mode of constructing the training data set according to the chromatic-aberration-free image is shown in FIG. 2, including the following steps:

in step S21, the brightness signal and the chromaticity signal in the chromatic-aberration-free image are separated to obtain a brightness image corresponding to the brightness signal of the chromatic-aberration-free image and obtain a chromaticity image corresponding to the chromaticity signal of the chromatic-aberration-free image.

Specifically, the brightness signal Y and the chromaticity signal UV in the chromatic-aberration-free image are separated to obtain a brightness image corresponding to the brightness signal Y of the chromatic-aberration-free image and obtain a chromaticity image corresponding to the chromaticity signal UV of the chromatic-aberration-free image. The brightness image corresponding to the brightness signal Y of the chromatic-aberration-free image is a black-white grayscale image.

In step S22, the brightness image is subjected to object edge detection to obtain an object edge image corresponding to the brightness image.

In a possible implementation manner, the brightness image of the chromatic-aberration-free image may be subjected to edge detection by an edge detection algorithm similar to a Canny edge detection algorithm to obtain an object edge image corresponding to the chromatic-aberration-free image. The object edge image may be a binary image.

In step S23, object edge position information in the chromaticity image is determined according to the position of a pixel point representing the object edge in the object edge image.

Specifically, in step S22, after the object edge image is obtained, object edge position information in the chromaticity image may be determined according to the position of a pixel point representing the object edge in the object edge image.

In step S24, a chromatic fringing with a preset width is added at the object edge in the chromaticity image according to the object edge position information to obtain a new chromaticity image.

Exemplarily, assuming that the preset width is equal to 3 pixel widths, a chromatic fringing with 3 pixel widths is added to a direction from the object edge in the chromaticity image to the outside of the object according to the object edge position information to obtain a new chromaticity image. The added chromatic fringing does not cover a pixel point where the object edge is located. Exemplarily, assuming that the preset width is equal to 2 pixel widths, the width of the object edge in the chromaticity image is equal to 1 pixel point (or 2 and 3 pixel points). A chromatic fringing with 2 pixel widths and a preset color is added to a target side of the 1 pixel point in the chromaticity image to obtain a new chromaticity image. The target side is an outer side of the object.

In step S25, the brightness image and the new chromaticity image are synthesized to obtain a chromatic-aberration image, where the image formats of the chromatic-aberration image and the chromatic-aberration-free image are the YUV format.

The brightness image (that is, Y component information) and the new chromaticity image (that is, UV component information) are synthesized to obtain the chromatic-aberration image with the YUV format.

In step S26, the chromatic-aberration image and the chromatic-aberration-free image serve as the training data set.

By this mode of constructing the training data set according to the chromatic-aberration-free image, an chromatic-aberration image with a chromatic fringing can be constructed reversely according to the chromatic-aberration-free image without chromatic fringing. The mode of constructing the training data set in the disclosure is simpler, more convenient and easier than the mode of constructing the chromatic-aberration-free image without chromatic fringing forward according to the chromatic-aberration image with chromatic fringing. The reason is that any method for removing the chromatic fringing in related technologies is used to perform chromatic fringing removal on the chromatic-aberration image with chromatic fringing, which cannot obtain the completely clean chromatic-aberration-free image without the chromatic fringing.

After the training data set is constructed and when the chromatic aberration-removing model is trained by the training data set, the chromatic aberration-removing model with higher robustness and more excellent effect can be trained by using the chromatic-aberration image and the clean chromatic-aberration-free image without chromatic fringing which are reversely constructed by the above mode in the disclosure.

It should be noted that when the chromatic-aberration image in the training data set is constructed, the disclosure does not specifically limit to the color added to the chromatic fringing in the image, the color fringing may be purple, red, blue, yellow, green and the like.

The image with the YUV format is mainly used to optimize the transmission of a color video signal so as to be backward compatible with the old black-and-white television. Compared with the transmission of the RGB video signal, its biggest advantage is that it is only necessary to occupy very little bandwidth (RGB requires simultaneous transmission of three independent video signals). Therefore, regardless of bandwidth, the image that a user generally requires is an image with an RGB format. In consequence, in an implementable manner, after the target image output by the chromatic aberration-removing model is obtained, if the image format of the target image is the YUV format, the image processing method may further include the following steps:

the target image is subjected to format conversion to obtain a target image of which the image format is the RGB format; and the target image with the RGB format is fed back to a terminal of the user, thereby adapting to the requirement of using the target image with the RGB format by the user.

By the above method provided in the disclosure, the chromatic fringing is present at the object edge of the to-be-processed image by acquiring the to-be-processed image, and the to-be-processed image is input into the chromatic aberration-removing model to obtain the target image output by the chromatic aberration-removing model. The image format of the to-be-processed image is the YUV format, so when performing chromatic fringing removal on the to-be-processed image, the chromatic aberration-removing model may only perform chromatic aberration correction on a UV chromaticity signal at the chromatic fringing position of the to-be-processed image without changing a Y brightness signal of the whole to-be-processed image. Therefore, according to the mode of performing chromatic fringing removal on the to-be-processed image by the chromatic aberration-removing model in the disclosure, the brightness information loss in the to-be-processed image can be avoided, and the target image with excellent effect is achieved. Consequently, this mode in the disclosure improves the effect of removing the chromatic fringing in the image.

Optionally, the chromatic aberration-removing model is a deep convolutional neural network model.

In the present application, the architecture of the chromatic aberration-removing model may be the architecture of the deep convolutional neural network model in a deep learning model, certainly, it may be the architecture of other deep learning models, which is not specifically limited in the disclosure.

It should be explained that deep learning refers to machine learning based on an artificial neural network. Different from the traditional machine learning, the deep learning model requires a large amount of manually annotated samples for training, so that the deep learning model with higher accuracy can be obtained. The deep learning model generally includes a multi-layer artificial neural network. By increasing the depth and breadth of the artificial neural network, the fitting ability of the artificial neural network can be improved, and a deep learning model with higher robustness can be obtained. The essence of the deep learning model is to learn a mapping relationship $f(x)=y$, for example, if x is an input handwritten digital picture, y is one of the output digits 0-9. In the application scenario of the disclosure, the input x of the chromatic aberration-removing model refers to a to-be-processed image with a chromatic fringing, and the output y refers to a target image after the chromatic fringing is removed.

It should be noted that the process of training one deep learning model is generally as follows: a training data set is prepared firstly. The form of the training data set is usually the paired (x, y) form, where x is input data, and y is corresponding output data. After the training data set is prepared, x is input into the deep learning model for forward propagation to obtain y_ output by the deep learning model. Further, (y, y) is input into a loss function, and after the convergence degree (the smaller the loss value, the better) of an error judgment model is calculated, a gradient vector is determined through back propagation (reverse derivation). Further, each model parameter of the deep learning model is adjusted through the gradient vector. Then a new y_ is obtained by calculating the input x of the deep learning model again until the set number of times through iteration or until the average value of the loss error no longer drops, and the trained deep learning model is obtained. The training principle of the chromatic aberration-removing model in the disclosure is shown as above.

Exemplarily, the step of obtaining the chromatic aberration-removing model through training by the training data set includes: the deep convolutional neural network is trained according to the chromatic-aberration image, the chromatic-aberration-free image and a preset loss function in the training data set to obtain the chromatic aberration-removing model. The preset loss function is:

$$g=\mathrm{loss}(y,y)=c\times|y-y\_|,$$

where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

The chromatic fringing always occurs at the edge of the high-contrast area, so in the technical solution of the disclosure, in order to improve the training effect of the chromatic aberration-removing model, the preset loss function is designed as the loss function with self-adaptive weight. Self-adaptive weight information corresponds to a parameter c in the preset loss function, and c represents a set of probability values that each pixel point in the object edge image is an object edge pixel point. It is easy to understand that the larger the probability value of the pixel point is, the higher the possibility of representing that the pixel point is the object edge pixel point. The self-adaptive weight information c is applied to the preset loss function, the chromatic aberration-removing model may pay more attention to the edge of the high-contrast area with large weight, that is, more attention to the chromatic fringing, and may pay less attention to the non-high-contrast area with small weight, that is, less attention to the non-chromatic fringing. In a case that the chromatic aberration-removing model pays more attention to the edge of the high-contrast area with large weight, that is, more attention to the chromatic fringing, and pays less attention to the non-high-contrast area with small weight, that is, less attention to the non-chromatic fringing, the data calculation quantity of the chromatic aberration-removing model can be effectively reduced, and the chromatic aberration identification accuracy can be improved.

It is easy to understand that in an image, the pixel with the chromatic fringing accounts generally small of all the pixels, generally about 5%. The self-adaptive weight information c is applied to a preset loss function, so that only the pixel area with the chromatic fringing is corrected, a large amount of useless calculation is avoided (that is, calculating whether the chromatic aberration phenomenon exists in the pixel of the area without the chromatic fringing is avoided), and the processing speed of removing the chromatic fringing by the chromatic aberration-removing model is increased.

Therefore, the chromatic aberration-removing model obtained through training by the preset loss function can rapidly perform chromatic fringing removal on the to-be-processed image due to small data calculation amount of the chromatic aberration-removing model so as to obtain the target image. In this way, the image processing method provided by the disclosure can meet the real-time requirements of users.

Figure 3:
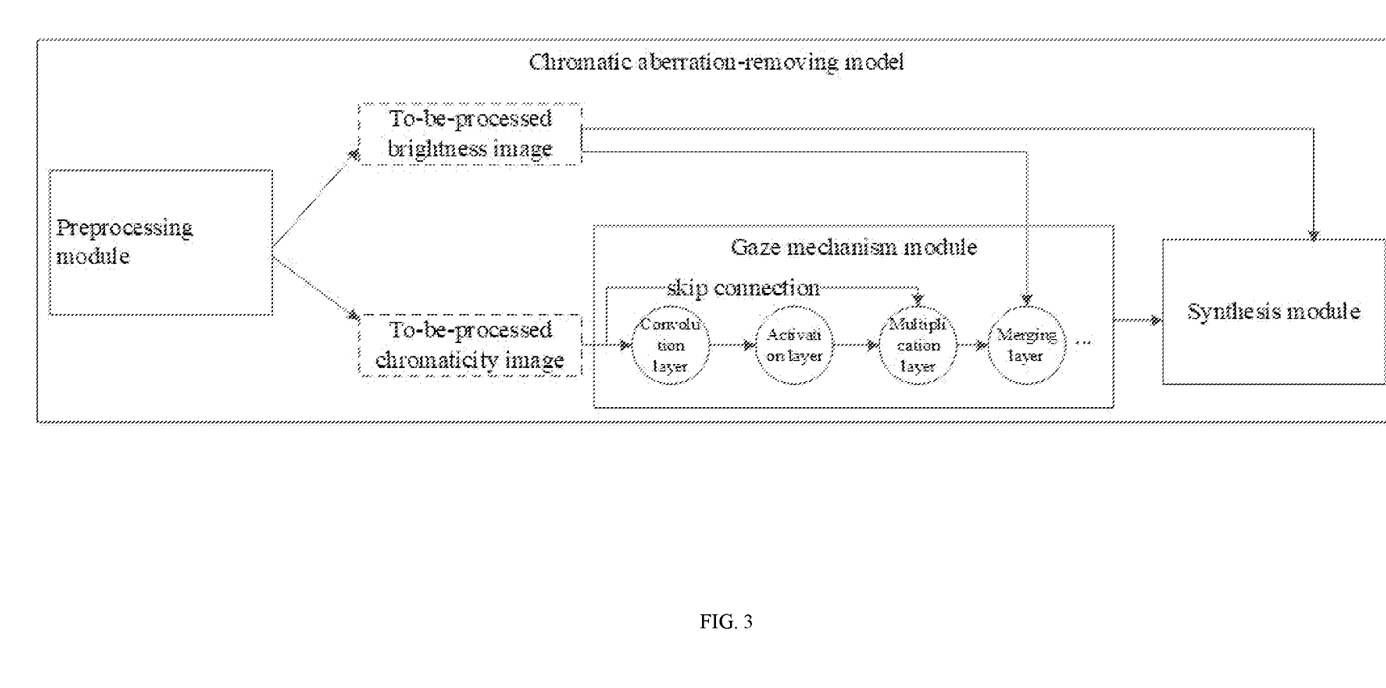
FIG. 3 is a architecture diagram of a chromatic aberration-removing model according to an example.

Optionally, the architecture of the chromatic aberration-removing model in the disclosure is shown in FIG. 3, the chromatic aberration-removing model includes a preprocessing module, a gaze mechanism module and a synthesis module. The step of inputting the to-be-processed image into a chromatic aberration-removing model to obtain a target image output by the chromatic aberration-removing model includes:

inputting the to-be-processed image into the preprocessing module. The preprocessing module separates a brightness signal and a chromaticity signal of the to-be-processed image to obtain a to-be-processed brightness image corresponding to the brightness signal of the to-be-processed image and obtain a to-be-processed chromaticity image corresponding to the chromaticity signal of the to-be-processed image, and inputs the to-be-processed brightness image and the to-be-processed chromaticity image into the gaze mechanism module;

the gaze mechanism module calculates a chromatic aberration correction value according to object edge feature information in the to-be-processed brightness image and the to-be-processed chromaticity image to obtain to-be-processed chromaticity image correction information, and inputs the to-be-processed chromaticity image, the to-be-processed brightness image and the to-be-processed chromaticity image correction information into the synthesis module; and the synthesis module corrects the to-be-processed chromaticity image according to the to-be-processed chromaticity image correction information to obtain a corrected to-be-processed chromaticity image, synthesizes the corrected to-be-processed chromaticity image and the to-be-processed brightness image into the target image, and outputs the target image.

Correspondingly, the preprocessing module separates a brightness signal and a chromaticity signal in the to-be-processed image to obtain a to-be-processed brightness image corresponding to the brightness signal of the to-be-processed image and obtain a to-be-processed chromaticity image corresponding to the chromaticity signal of the to-be-processed image;

the gaze mechanism module calculates a chromatic aberration correction value according to object edge feature information in the to-be-processed brightness image and the to-be-processed chromaticity image to obtain to-be-processed chromaticity image correction information; and the synthesis module corrects the to-be-processed chromaticity image according to the to-be-processed chromaticity image correction information to obtain a corrected to-be-processed chromaticity image, and synthesize the corrected to-be-processed chromaticity image and the to-be-processed brightness image into the target image.

The gaze mechanism module includes a chromaticity information convolution layer cony, a chromaticity information activation layer sigmoid, a chromaticity information multiplication layer and a chromaticity information merging layer elt-prod which are sequentially connected in series; the chromaticity information convolution layer is used to perform convolution processing on input data of the gaze mechanism module to obtain a first chromaticity image feature; the chromaticity information activation layer is used to perform activation operation on the first chromaticity image feature to obtain a second chromaticity image feature; the chromaticity information multiplication layer is used to perform co-location point multiplication processing on input data of the gaze mechanism module and the second chromaticity image feature based on a skip layer skip connection to obtain a third chromaticity image feature; and the chromaticity information merging layer concat is used to merge the third chromaticity image feature and the object edge feature information of the to-be-processed brightness image to obtain the to-be-processed chromaticity image correction information.

Optionally, the gaze mechanism module includes a plurality of gaze mechanism modules which are connected in series, input data of the first gaze mechanism module of the plurality of gaze mechanism modules is the to-be-processed chromaticity image, input data of the non-first gaze mechanism module of the plurality of gaze mechanism modules is output data of the previous gaze mechanism module, and the to-be-processed chromaticity image correction information is output data of the last gaze mechanism module of the plurality of gaze mechanism modules.

In a case that the chromatic aberration-removing model includes a plurality of gaze mechanism modules connected in series and/or in parallel, input data of the first gaze mechanism module of the plurality of gaze mechanism modules is a to-be-processed chromaticity image, input data of the non-first gaze mechanism module of the plurality of gaze mechanism modules is output data of the previous gaze mechanism module, the output data of the previous gaze mechanism module may be called intermediate layer chromaticity image correction information, and output data of the last gaze mechanism module is to-be-processed chromaticity image correction information.

It should be noted that the output data of the gaze mechanism module is the to-be-processed chromaticity image correction information, so the correction value of each pixel point in the to-be-processed chromaticity image correction information may serve as a chromatic aberration value (the chromatic aberration value is used to measure the chromatic aberration) of each pixel point. If an absolute value of a correction value corresponding to a certain pixel point is less than a certain value, it may be considered that there is no chromatic aberration in the pixel point, and the synthesis module may omit the operation of correcting the pixel point. If an absolute value of a correction value to a certain pixel point is greater than a certain value, it may be considered that there is chromatic aberration in the pixel point, and the synthesis module performs the operation of correcting the pixel point.

By the architecture of the chromatic aberration-removing model provided by the disclosure, the chromatic aberration-removing model is trained according to the preset loss function, so that the chromatic aberration-removing model learns a manner similar to attention mechanism to realize high attention on the chromatic fringing, thereby enhancing the performance of the chromatic aberration-removing model for removing the chromatic fringing of the image.

The examples of the disclosure further disclose a method for training a chromatic aberration-removing model. The method includes:

acquiring one or a plurality of chromatic-aberration-free images, and constructing a corresponding chromatic-aberration image according to the chromatic-aberration-free image; generating a training data set according to one or a plurality of chromatic-aberration-free images and the corresponding chromatic-aberration image; and training a deep convolutional neural network model according to the training data set to obtain the chromatic aberration-removing model.

In a possible implementation manner, the step of constructing the corresponding chromatic-aberration image according to the chromatic-aberration-free image specifically includes the following implementation steps:

a brightness signal and a chromaticity signal of the chromatic-aberration-free image are separated to obtain a brightness image corresponding to the brightness signal of the chromatic-aberration-free image and obtain a chromaticity image corresponding to the chromaticity signal of the chromatic-aberration-free image; an object edge image is determined according to the brightness image, and a chromatic fringing with a preset width is added at the object edge in the chromaticity image based on object edge position information represented by the object edge image to obtain a new chromaticity image; and the brightness image and the new chromaticity image are synthesized to obtain the chromatic-aberration image corresponding to the chromatic-aberration-free image.

For any chromatic-aberration-free image, the corresponding chromatic-aberration image can be obtained through the above image constructing method.

The color of the chromatic fringing is at least one of red, green, blue, yellow, purple and other colors.

In a possible implementation manner, the step of training the deep convolutional neural network model according to the training data set to obtain the chromatic aberration-removing model specifically may include the following steps:

train a deep convolutional neural network model according to the training data set and a preset loss function to obtain the chromatic aberration-removing model. The preset loss function is:

$$g = \text{loss}(y, y\_) = c \times |y - y\_|,$$

where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

In examples of the method for training the chromatic aberration-removing model, the specific implementation manners of various steps have been described in detail in the examples of the related image processing method, and details are not described herein.

Figure 4:
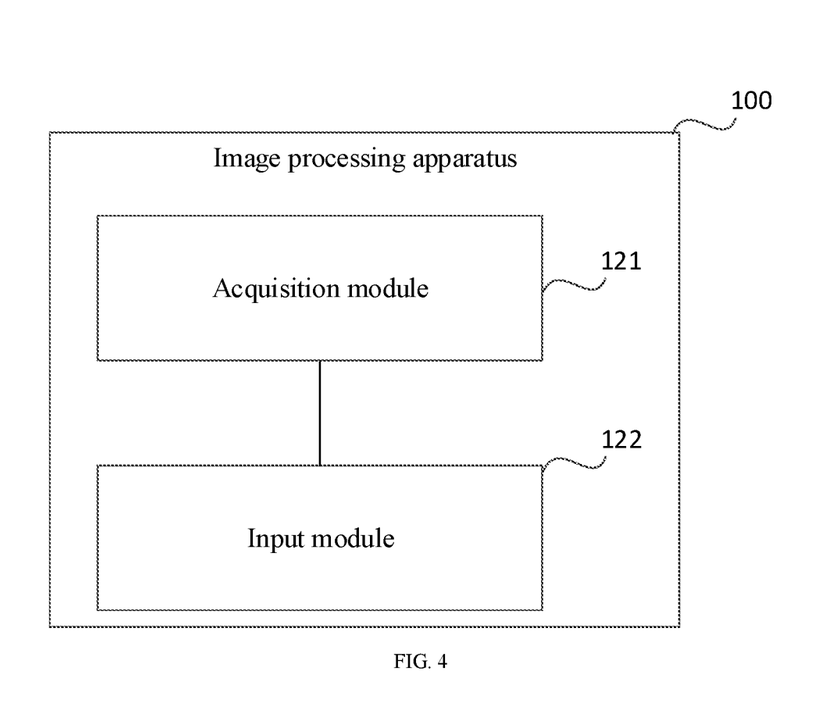
FIG. 4 is a block diagram of an image processing apparatus according to an example.

FIG. 4 is a block diagram of an image processing apparatus according to an exemplary example. Referring to FIG. 4, the apparatus 100 includes an acquisition module 121 and an input module 122.

The acquisition module 121 is configured to acquire the to-be-processed image.

The input module 122 is configured to input the to-be-processed image into a chromatic aberration-removing model to obtain a target image output by the chromatic aberration-removing model.

where the chromatic aberration-removing model is obtained by a training data set through training, the training data set includes multiple groups of sample data, and each group of sample data includes a chromatic-aberration-free image and a chromatic-aberration image corresponding to the chromatic-aberration-free image.

By adoption of the apparatus, the to-be-processed image is acquired, and the to-be-processed image is input into the chromatic aberration-removing model to obtain the target image output by the chromatic aberration-removing model. Compared with the method in related technologies, the method for processing by the model can improve the speed and accuracy of removing chromatic aberration of the image.

Optionally, the chromatic-aberration image corresponding to the chromatic-aberration-free image is obtained by the following modes:

separating a brightness signal and a chromaticity signal of the chromatic-aberration-free image to obtain a brightness image corresponding to the brightness signal of the chromatic-aberration-free image and obtain a chromaticity image corresponding to the chromaticity signal of the chromatic-aberration-free image;

determining an object edge image according to the brightness image, and adding a chromatic fringing with a preset width at the object edge in the chromaticity image based on object edge position information represented by the object edge image to obtain a new chromaticity image; and synthesizing the brightness image and the new chromaticity image to obtain the chromatic-aberration image corresponding to the chromatic-aberration-free image.

Optionally, the apparatus further includes a training module, configured to train a deep convolutional neural network model according to the training data set and a preset loss function to obtain the chromatic aberration-removing model. The preset loss function is:

$$g = \text{loss}(y, y) = c \times |y - y_-|,$$

where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

Optionally, the chromatic aberration-removing model includes a preprocessing module, a gaze mechanism module and a synthesis module. The input module is used to:

inputting the to-be-processed image into the preprocessing module. The preprocessing module separates a brightness signal and a chromaticity signal of the to-be-processed image to obtain a to-be-processed brightness image corresponding to the brightness signal of the to-be-processed image and obtain a to-be-processed chromaticity image corresponding to the chromaticity signal of the to-be-processed image, and inputs the to-be-processed brightness image and the to-be-processed chromaticity image into the gaze mechanism module. The gaze mechanism module calculates a chromatic aberration correction value according to object edge feature information in the to-be-processed brightness image and the to-be-processed chromaticity image to obtain to-be-processed chromaticity image correction information, and inputs the to-be-processed chromaticity image, the to-be-processed brightness image and the to-be-processed chromaticity image correction information into the synthesis module. The synthesis module corrects the to-be-processed chromaticity image according to the to-be-processed chromaticity image correction information to obtain a corrected to-be-processed chromaticity image, synthesizes the corrected to-be-processed chromaticity image and the to-be-processed brightness image into the target image, and outputs the target image.

Optionally, the gaze mechanism module includes a chromaticity information convolution layer, a chromaticity information activation layer, a chromaticity information multiplication layer and a chromaticity information merging layer which are sequentially connected in series;

the chromaticity information convolution layer is used to perform convolution processing on input data of the gaze mechanism module to obtain a first chromaticity image feature;

the chromaticity information activation layer is used to perform activation operation on the first chromaticity image feature to obtain a second chromaticity image feature;

the chromaticity information multiplication layer is used to perform co-location point multiplication processing on input data of the gaze mechanism module and the second chromaticity image feature to obtain a third chromaticity image feature; and the chromaticity information merging layer is used to merge the third chromaticity image feature and the object edge feature information of the to-be-processed brightness image to obtain the to-be-processed chromaticity image correction information.

Optionally, the gaze mechanism module includes a plurality of gaze mechanism modules which are connected in series, input data of the first gaze mechanism module of the plurality of gaze mechanism modules is the to-be-processed chromaticity image, input data of the non-first gaze mechanism module of the plurality of gaze mechanism modules is output data of the previous gaze mechanism module, and the to-be-processed chromaticity image correction information is output data of the last gaze mechanism module of the plurality of gaze mechanism modules.

Optionally, the apparatus further includes:

a response module, configured to, before the step of acquiring the to-be-processed image, acquire an image input by a user in response to an input operation performed by the user;

a first conversion module, configured to perform format conversion on the image input by the user in a case that the image format of the image input by the user is an RGB format to obtain the to-be-processed image with a YUV format.

Optionally, the image format of the target image is the YUV format. The apparatus further includes:

a second conversion module, configured to, after the step of obtaining the target image output by the chromatic aberration-removing model, perform format conversion on the target image to obtain a target image of which the image format is the RGB format; and a feedback module, configured to feed the target image with the RGB format back to a terminal of the user.

With regard to the apparatuses in the above examples, the specific manners that various modules perform operations have been described in detail in the examples relating to the methods, and details are not described herein.

Based on the same invention concept, the examples of the disclosure provide an apparatus for training a chromatic aberration-removing model. The apparatus includes:

an acquisition module, configured to acquire one or a plurality of chromatic-aberration-free images, and constructing a chromatic-aberration image corresponding to the chromatic-aberration-free image;

a generation module, configured to generate a training data set according to one or a plurality of chromatic-aberration-free images and the corresponding chromatic-aberration image; and a training module, configured to train a deep convolutional neural network model according to the training data set to obtain the chromatic aberration-removing model.

Optionally, the acquisition module includes:

a separation sub-module, configured to separate a brightness signal and a chromaticity signal of the chromatic-aberration-free image to obtain a brightness image corresponding to the brightness signal of the chromatic-aberration-free image and obtain a chromaticity image corresponding to the chromaticity signal of the chromatic-aberration-free image;

an addition sub-module, configured to determine an object edge image according to the brightness image, and add a chromatic fringing with a preset width at the object edge in the chromaticity image based on object edge position information represented by the object edge image to obtain a new chromaticity image; and a synthesis sub-module, configured to synthesize the brightness image and the new chromaticity image to obtain the chromatic-aberration image corresponding to the chromatic-aberration-free image.

Optionally, the training module is configured to:

train a deep convolutional neural network model according to the training data set and a preset loss function to obtain the chromatic aberration-removing model. The preset loss function is:

$$g=\mathrm{loss}(y,y\_)=c\times|y-y\_|,$$

where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

The disclosure further proposes a computer-readable storage medium, storing a computer program instruction thereon. When the program instruction is executed by a processor, the steps in the image processing method or the method for training the chromatic aberration-removing model provided by the disclosure are implemented.

Figure 5:
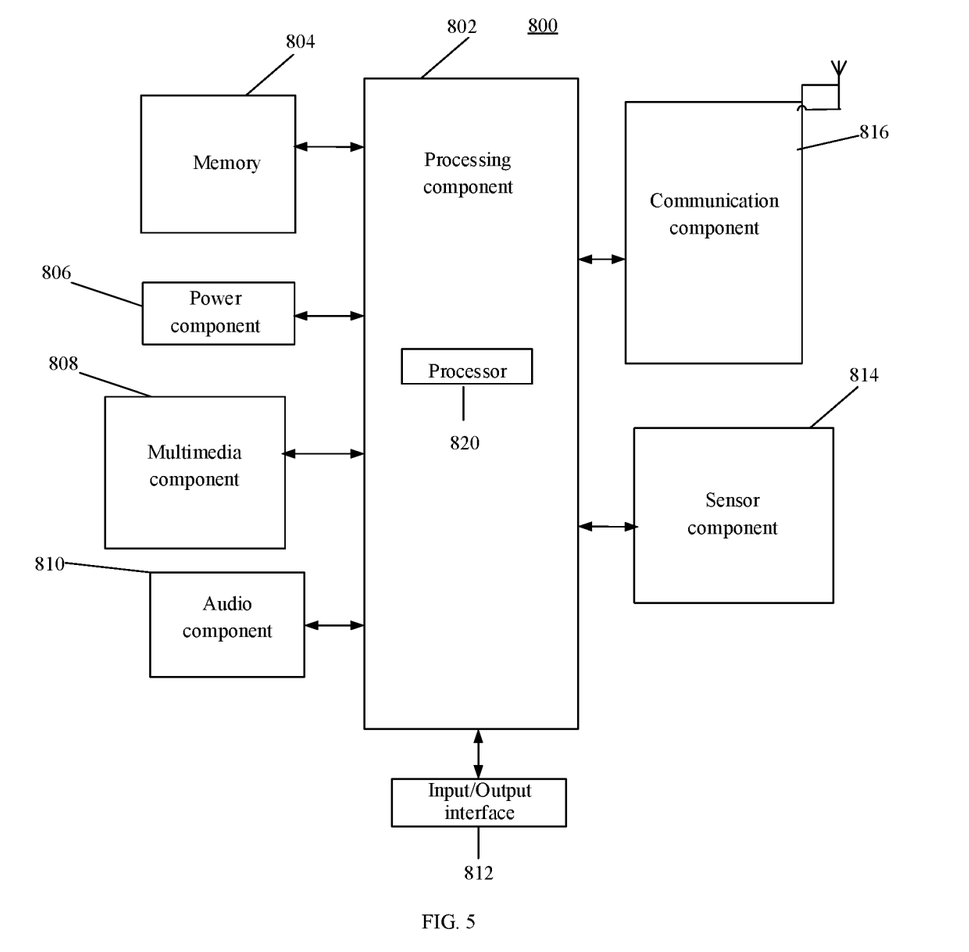
FIG. 5 is a block diagram of an apparatus according to an example.

FIG. 5 is a block diagram of an apparatus 800 for image processing according to an exemplary example. For example, the apparatus 800 may be a mobile phone, a computer, a digital broadcasting terminal, a messaging device, a game console, a tablet device, a medical device, a fitness device, a personal digital assistant, etc.

Referring to FIG. 5, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 usually controls the overall operations of the device 800, such as operations associated with display, telephone call, data communication, camera operation and recording operation. The processing component 802 may include one or more processors 820 to execute instructions to complete all of or part of the steps of the above image processing method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Examples of these data include instructions for any application or method operated on the device 800, contact data, phone book data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 806 supplies power to various components of the apparatus 800. The power component 806 may include a power management system, one or more power sources, and other components associated with power generation, management and distribution of the apparatus 800.

The multimedia component 808 includes a screen for providing an output interface between the apparatus 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 808 includes a front camera and/or a rear camera. When the apparatus 800 is in an operation mode, such as a shooting mode or a video mode, the front camera and/or the rear camera can receive external multimedia data. Each front or rear camera may be a fixed optical lens system or have focal length and optical zoom capability.

The audio component 810 is configured to output and/or input audio signals. For example, the audio component 810 includes a microphone (MIC), which is configured to receive external audio signals when the apparatus 800 is in an operational mode, such as a call mode, a recording mode and a voice recognition mode. The received audio signals may be further stored in the memory 804 or sent by the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, buttons, etc. These buttons may include, but are not limited to a home button, a volume button, a start button and a lock button.

The sensor component 814 includes one or more sensors for providing various aspects of status assessment for the apparatus 800. For example, the sensor component 814 may detect the on/off state of the apparatus 800, and relative positions of components such as a display and a keypad of the apparatus 800. The sensor component 814 may also detect a position change of the apparatus 800 or one component of the apparatus 800, presence or absence of contact between the user and the apparatus 800, an orientation or acceleration/deceleration of the apparatus 800 and a temperature change of the apparatus 800. The sensor component 814 may include a proximity sensor configured to detect the presence of nearby objects without any physical contact. The sensor component 814 may also include an optical sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on communication standards, such as WiFi, 2G or 3G, or a combination thereof. In an exemplary example, the communication component 816 receives broadcast signals or broadcast associated information from an external broadcast management system via a broadcast channel. In one exemplary example, the communication component 816 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an exemplary example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above image processing method.

In an exemplary example, a non-transitory computer-readable storage medium including instructions is further provided, such as a memory 804 including instructions executable by the processor 820 of the apparatus 800 to complete the above image processing method. For example, the non-transitory computer-readable storage medium may be an ROM, a random access memory (RAM), a CD-ROM, a magnetic tape, a floppy disk, an optical data storage device, etc.

In another exemplary example, a computer program product is further provided. The computer program product includes a computer program executed by a programmable apparatus. The computer program is provided with a code part for performing the above imaging processing method when being executed by the programmable apparatus.

Figure 6:
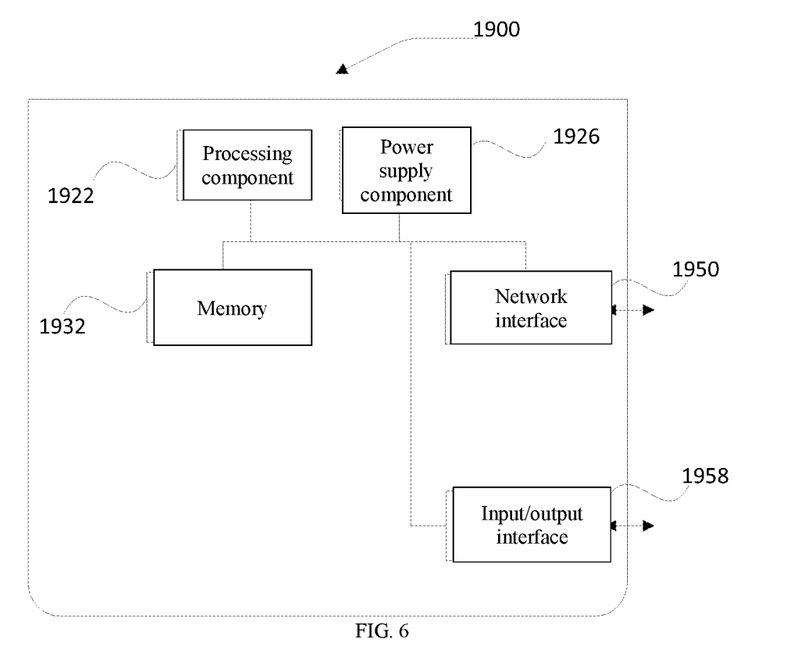
FIG. 6 is a block diagram of another apparatus according to an example.

FIG. 6 is a block diagram of an apparatus 1900 for image processing according to an exemplary example. For example, the apparatus 1900 may be provided as a server. Referring to FIG. 6, the apparatus 1900 includes a processing component 1922, which further includes one or more processors, and a memory resource represented by a memory 1932, for storing instructions executable by the processing component 1922, such as applications. The applications stored in the memory 1932 may include one or more modules each corresponding to a set of instructions. In addition, the processing component 1922 is configured to execute instructions to perform the steps of the above image processing method.

The apparatus 1900 may further include a power component 1926 configured to perform power management of the apparatus 1900, a wired or wireless network interface 1950 configured to connect the apparatus 1900 to a network, and an input/output (I/O) interface 1958. The apparatus 1900 may operate operating systems stored in the memory 1932, such as Windows Server™, Mac OS X™, Unix™, Linux™, FreeBSD™ or the like.

Those skilled in the art would readily conceive of other implementation solutions of the disclosure after considering the specification and practicing the disclosure herein. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The specification and the examples are merely regarded as exemplary, and the real scope and spirit of the disclosure are indicated by the following claims.

It should be understood that the disclosure is not limited to the precise structure described above and shown in the drawings, and various modifications and changes can be made without departing from its scope. The scope of the disclosure is only limited by the appended claims.

The invention claimed is:

1. An image processing method, comprising:
acquiring a to-be-processed image; and
inputting the to-be-processed image into a chromatic aberration-removing model to obtain a target image output by the chromatic aberration-removing model,
where the chromatic aberration-removing model is obtained by a training data set through training, the training data set comprises multiple groups of sample data, and each group of sample data comprises a chromatic-aberration-free image and a chromatic-aberration image corresponding to the chromatic-aberration-free image,
wherein the chromatic-aberration image corresponding to the chromatic-aberration-free image is obtained by:
separating a brightness signal and a chromaticity signal of the chromatic-aberration-free image to obtain a brightness image corresponding to the brightness signal of the chromatic-aberration-free image and obtain a chromaticity image corresponding to the chromaticity signal of the chromatic-aberration-free image;
determining an object edge image according to the brightness image, and adding a chromatic fringing with a preset width at the object edge in the chromaticity image based on object edge position information represented by the object edge image to obtain a new chromaticity image; and
synthesizing the brightness image and the new chromaticity image to obtain the chromatic-aberration image corresponding to the chromatic-aberration-free image.

2. The image processing method according to claim 1, wherein the chromatic aberration-removing model is obtained through training by:
training a deep convolutional neural network model according to the training data set and a preset loss function to obtain the chromatic aberration-removing model, wherein the preset loss function is:

$g=\text{loss}(y,y\_)=c\times|y-y\_|,$ where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

3. The image processing method according to claim 1, wherein the chromatic aberration-removing model comprises a preprocessing module, an attention mechanism module and a synthesis module; and the step of inputting the to-be-processed image into the chromatic aberration-removing model to obtain the target image output by the chromatic aberration-removing model comprises:
inputting the to-be-processed image into the preprocessing module, wherein the preprocessing module separates a brightness signal and a chromaticity signal of the to-be-processed image to obtain a to-be-processed brightness image corresponding to the brightness signal of the to-be-processed image and obtain a to-be-processed chromaticity image corresponding to the chromaticity signal of the to-be-processed image, and inputs the to-be-processed brightness image and the to-be-processed chromaticity image into the attention mechanism module;

wherein the attention mechanism module calculates a chromatic aberration correction value according to object edge feature information in the to-be-processed brightness image and the to-be-processed chromaticity image to obtain to-be-processed chromaticity image correction information, and inputs the to-be-processed chromaticity image, the to-be-processed brightness image and the to-be-processed chromaticity image correction information into the synthesis module; and wherein the synthesis module corrects the to-be-processed chromaticity image according to the to-be-processed chromaticity image correction information to obtain a corrected to-be-processed chromaticity image, synthesizes the corrected to-be-processed chromaticity image and the to-be-processed brightness image into the target image, and outputs the target image.

4. The image processing method according to claim 3, wherein the attention mechanism module comprises a chromaticity information convolution layer, a chromaticity information activation layer, a chromaticity information multiplication layer and a chromaticity information merging layer which are sequentially connected in series;

wherein the chromaticity information convolution layer is used to perform convolution processing on input data input into the attention mechanism module to obtain a first chromaticity image feature;

wherein the chromaticity information activation layer is used to perform activation operation on the first chromaticity image feature to obtain a second chromaticity image feature;

wherein the chromaticity information multiplication layer is used to perform co-location point multiplication processing on input data of the attention mechanism module and the second chromaticity image feature to obtain a third chromaticity image feature; and wherein the chromaticity information merging layer is used to merge the third chromaticity image feature and the object edge feature information of the to-be-processed brightness image to obtain the to-be-processed chromaticity image correction information.

5. The image processing method according to claim 4, wherein the attention mechanism module comprises a plurality of attention mechanism modules which are connected in series, input data of a first attention mechanism module of the plurality of attention mechanism modules is the to-be-processed chromaticity image, input data of a non-first attention mechanism module of the plurality of attention mechanism modules is output data of a previous attention mechanism module, and the to-be-processed chromaticity image correction information is output data of a last attention mechanism module of the plurality of attention mechanism modules.

6. The image processing method according to claim 1, wherein before acquiring the to-be-processed image, the method comprises:

acquiring an image input by a user in response to an input operation performed by the user;

performing format conversion on the image input by the user if an image format of the image input by the user is an RGB format to obtain the to-be-processed image with a YUV format.

7. The image processing method according to claim 6, wherein an image format of the target image is the YUV format; and after acquiring the target image output by the chromatic aberration-removing model, the image processing method comprises:

performing format conversion on the target image to obtain a target image of which the image format is the RGB format;

feeding the target image with the RGB format back to a terminal of the user.

8. A non-transitory computer-readable storage medium storing computer-executable instructions that, when executed by a processor, cause the processor to perform the method according to claim 1.

9. A method for training a chromatic aberration-removing model, the method comprising:

acquiring one or a plurality of chromatic-aberration-free images, and constructing a chromatic-aberration image corresponding to the chromatic-aberration-free image;

generating a training data set according to the one or a plurality of chromatic-aberration-free images and the corresponding chromatic-aberration image; and training a deep convolutional neural network model according to the training data set to obtain the chromatic aberration-removing model, wherein constructing the chromatic-aberration image corresponding to the chromatic-aberration-free image comprising:

separating a brightness signal and a chromaticity signal of the chromatic-aberration-free image to obtain a brightness image corresponding to the brightness signal of the chromatic-aberration-free image and obtain a chromaticity image corresponding to the chromaticity signal of the chromatic-aberration-free image;

determining an object edge image according to the brightness image, and adding a chromatic fringing with a preset width at the object edge in the chromaticity image based on object edge position information represented by the object edge image to obtain a new chromaticity image; and synthesizing the brightness image and the new chromaticity image to obtain the chromatic-aberration image corresponding to the chromatic-aberration-free image.

10. An apparatus for training a chromatic aberration-removing model, the apparatus comprising:

a processor; and a memory for storing processor-executable instructions;

wherein the processor is configured to perform the method for training a chromatic aberration-removing model according to claim 9.

11. A non-transitory computer-readable storage medium storing computer-executable instructions that, when executed by a processor, cause the processor to perform the method according to claim 9.

12. An image processing apparatus, comprising:

a processor; and a memory for storing processor-executable instructions;

wherein, the processor is configured to, upon execution of the processor-executable instructions:

acquire a to-be-processed image; and input the to-be-processed image into a chromatic aberration-removing model to obtain a target image output by the chromatic aberration-removing model, where the chromatic aberration-removing model is obtained by a training data set through training, the training data set comprises multiple groups of sample data, and each group of sample data comprises a chromatic-aberration-free image and a chromatic-aberration image corresponding to the chromatic-aberration-free image, wherein the processor is further configured to:
separate a brightness signal and a chromaticity signal of the chromatic-aberration-free image to obtain a brightness image corresponding to the brightness signal of the chromatic-aberration-free image and obtain a chromaticity image corresponding to the chromaticity signal of the chromatic-aberration-free image;

determine an object edge image according to the brightness image, and adding a chromatic fringing with a preset width at the object edge in the chromaticity image based on object edge position information represented by the object edge image to obtain a new chromaticity image; and synthesize the brightness image and the new chromaticity image to obtain the chromatic-aberration image corresponding to the chromatic-aberration-free image.

13. The image processing apparatus according to claim 12, wherein the processor is further configured to:
train a deep convolutional neural network model according to the training data set and a preset loss function to obtain the chromatic aberration-removing model, wherein the preset loss function is:

$g=\mathrm{loss}(y,y\_)=c\times|y-y\_|,$ where g represents loss information between a first target image y_ generated by the chromatic aberration-removing model according to the chromatic-aberration image and the chromatic-aberration-free image y corresponding to the chromatic-aberration image in the training process of the chromatic aberration-removing model, and c represents a set of probability values that each pixel point in the object edge image is an object edge pixel point.

14. The image processing apparatus according to claim 12, wherein the processor is further configured to:
input the to-be-processed image into a preprocessing module, wherein the preprocessing module separates a brightness signal and a chromaticity signal of the to-be-processed image to obtain a to-be-processed brightness image corresponding to the brightness signal of the to-be-processed image and obtain a to-be-processed chromaticity image corresponding to the chromaticity signal of the to-be-processed image, and inputs the to-be-processed brightness image and the to-be-processed chromaticity image into a attention mechanism module;

wherein the attention mechanism module calculates a chromatic aberration correction value according to object edge feature information in the to-be-processed brightness image and the to-be-processed chromaticity image to obtain to-be-processed chromaticity image correction information, and inputs the to-be-processed chromaticity image, the to-be-processed brightness image and the to-be-processed chromaticity image correction information into a synthesis module; and wherein the synthesis module corrects the to-be-processed chromaticity image according to the to-be-processed chromaticity image correction information to obtain a corrected to-be-processed chromaticity image, synthesizes the corrected to-be-processed chromaticity image and the to-be-processed brightness image into the target image, and outputs the target image.

15. The image processing apparatus according to claim 14, wherein the attention mechanism module comprises a chromaticity information convolution layer, a chromaticity information activation layer, a chromaticity information multiplication layer and a chromaticity information merging layer which are sequentially connected in series;

wherein the chromaticity information convolution layer is used to perform convolution processing on input data input into the attention mechanism module to obtain a first chromaticity image feature;

wherein the chromaticity information activation layer is used to perform activation operation on the first chromaticity image feature to obtain a second chromaticity image feature;

wherein the chromaticity information multiplication layer is used to perform co-location point multiplication processing on input data of the attention mechanism module and the second chromaticity image feature to obtain a third chromaticity image feature; and wherein the chromaticity information merging layer is used to merge the third chromaticity image feature and the object edge feature information of the to-be-processed brightness image to obtain the to-be-processed chromaticity image correction information.

16. The image processing apparatus according to claim 15, wherein the attention mechanism module comprises a plurality of attention mechanism modules which are connected in series, input data of a first attention mechanism module of the plurality of attention mechanism modules is the to-be-processed chromaticity image, input data of a non-first attention mechanism module of the plurality of attention mechanism modules is output data of a previous attention mechanism module, and the to-be-processed chromaticity image correction information is output data of a last attention mechanism module of the plurality of attention mechanism modules.

17. The image processing apparatus according to claim 12, wherein the processor is further configured to:
acquire an image input by a user in response to an input operation performed by the user;
perform format conversion on the image input by the user if an image format of the image input by the user is an RGB format to obtain the to-be-processed image with a YUV format.

18. The image processing apparatus according to claim 17, wherein the processor is further configured to:
perform format conversion on the target image to obtain a target image of which the image format is the RGB format; and
feed the target image with the RGB format back to a terminal of the user.

* * * * *